(12) United States Patent
Keskitalo et al.

(10) Patent No.: US 11,485,589 B2
(45) Date of Patent: Nov. 1, 2022

(54) SERVICE PLATFORM, CONTAINER HANDLING CARRIER AND METHOD

(71) Applicant: Cargotec Finland Oy, Tampere (FI)

(72) Inventors: Ville Keskitalo, Kärjenniemi (FI); Esa Parta, Tampere (FI); Janne Partanen, Tampere (FI); Timo Raunio, Tampere (FI); Veli-Matti Tourunen, Tampere (FI)

(73) Assignee: Cargotec Finland Oy, Tampere (FI)

( * ) Notice: Subject to any disclaimer, the term of this patent is extended or adjusted under 35 U.S.C. 154(b) by 988 days.

(21) Appl. No.: 16/224,369

(22) Filed: Dec. 18, 2018

(65) Prior Publication Data

US 2019/0218044 A1 Jul. 18, 2019

(30) Foreign Application Priority Data

Jan. 17, 2018 (FI) ...................... 20185043

(51) Int. Cl.
| | |
|---|---|
| *B66C 19/00* | (2006.01) |
| *B66F 9/18* | (2006.01) |
| *B65G 65/00* | (2006.01) |
| *B66C 13/12* | (2006.01) |
| *B65G 67/00* | (2006.01) |
| *B66C 13/52* | (2006.01) |
| *B65G 69/20* | (2006.01) |

(52) U.S. Cl.
CPC ............ *B65G 65/00* (2013.01); *B65G 67/00* (2013.01); *B65G 69/20* (2013.01); *B66C 13/12* (2013.01); *B66C 13/52* (2013.01); *B66C 19/007* (2013.01); *B66F 9/186* (2013.01); *B65G 2201/0235* (2013.01)

(58) Field of Classification Search
CPC ............................... B66C 19/007; B66F 9/186
See application file for complete search history.

(56) References Cited

U.S. PATENT DOCUMENTS

| | | | | | |
|---|---|---|---|---|---|
| 3,698,581 | A | * | 10/1972 | Goyarts | ................ B66C 19/007 212/326 |
| 4,256,230 | A | * | 3/1981 | Clark, Jr. | .............. B66C 19/007 414/460 |
| 4,266,904 | A | * | 5/1981 | Fadness | .................. B66C 1/101 212/319 |
| 4,599,030 | A | * | 7/1986 | Skaalen | ............... B62D 7/1509 187/244 |

(Continued)

FOREIGN PATENT DOCUMENTS

| | | |
|---|---|---|
| DE | 20 2004 018 066 U1 | 2/2005 |
| DE | 202006017624 U1 * | 3/2007 ............. B66C 1/102 |

(Continued)

OTHER PUBLICATIONS

German Office Action for German Patent Application No. 10 2018 132 207.0 dated Feb. 5, 2021, 7 pages (English translation).

(Continued)

*Primary Examiner* — Robert J Hoffberg
(74) *Attorney, Agent, or Firm* — Merchant & Gould P.C.

(57) ABSTRACT

A service platform, container handling carrier and method of arranging electrical drive control elements. The platform (8) comprises one or more mounting space between a top and bottom surfaces (15, 19). The mounting spaces may receive electrical components (29).

11 Claims, 4 Drawing Sheets

(56) References Cited

U.S. PATENT DOCUMENTS

| | | | | |
|---|---|---|---|---|
| 4,657,150 | A * | 4/1987 | Glickman | B66C 19/007 212/324 |
| 4,667,834 | A * | 5/1987 | Lanigan | B66C 19/007 212/324 |
| 4,838,438 | A * | 6/1989 | Ishige | B66C 13/22 212/324 |
| 5,638,420 | A * | 6/1997 | Armistead | B66C 19/02 378/146 |
| 5,810,183 | A | 9/1998 | Feider et al. | |
| 7,679,513 | B2 * | 3/2010 | King | B66C 19/007 700/214 |
| 7,731,041 | B2 * | 6/2010 | Gredel | B66C 19/007 212/316 |
| 7,898,415 | B2 * | 3/2011 | King | B66C 19/002 700/214 |
| 7,916,027 | B2 * | 3/2011 | King | B66F 9/0755 700/229 |
| 8,474,576 | B2 * | 7/2013 | Renish | E04G 1/15 206/372 |
| 9,321,614 | B2 | 4/2016 | Moran et al. | |
| 9,701,518 | B2 * | 7/2017 | Rosenström | B66C 19/005 |
| 9,771,245 | B2 * | 9/2017 | Kang | B66C 19/007 |
| 9,845,227 | B2 * | 12/2017 | Ojapalo | B66C 19/007 |
| 2011/0272212 | A1 | 11/2011 | Trant | |
| 2012/0043161 | A1 | 2/2012 | Renish | |
| 2014/0017045 | A1 * | 1/2014 | Wieschemann | B66C 13/12 414/800 |
| 2014/0017046 | A1 * | 1/2014 | Wieschemann | B66C 19/007 414/460 |
| 2017/0015532 | A1 * | 1/2017 | Ojapalo | B66C 19/007 |
| 2020/0122983 | A1 * | 4/2020 | Huang | B66C 13/22 |

FOREIGN PATENT DOCUMENTS

| | | | |
|---|---|---|---|
| DE | 10 2007 049 012 A1 | 4/2009 | |
| EP | 0 206 110 A1 | 12/1986 | |
| EP | 1506888 A1 * | 2/2005 | B66C 19/007 |
| EP | 1731473 A2 * | 12/2006 | B66C 19/007 |
| KR | 10-1032366 B1 | 5/2011 | |

OTHER PUBLICATIONS

Great Britain Examination Report for GB Application No. 18185758.3 dated Oct. 8, 2021 (1 page).
Finnish Search Report for corresponding Finnish Patent Application No. 20185043 dated Apr. 24, 2018, 2 pages.

* cited by examiner

SERVICE PLATFORM, CONTAINER HANDLING CARRIER AND METHOD

This application claims benefit of Serial No. 20185043, filed 17 Jan. 2018 in Finland, and which application is incorporated herein by reference. To the extent appropriate, a claim of priority is made to the above disclosed application.

BACKGROUND OF THE INVENTION

The invention relates to a service platform of a container handling carrier. The service platform allows access to desired locations where exists a need for service.

The invention further relates to a container handling carrier which is designed to carry transport containers at harbors and container storage areas. Furthermore, the invention relates to a method of arranging electrical drive control components of a container handling carrier.

The field of the invention is defined more specifically in the preambles of the independent claims.

Straddle carriers, shuttle carriers and corresponding container handling carriers are vehicles which are used for moving transport containers at port terminals and container yards. The containers are carried between wheeled legs of the carrier. Nowadays the carriers comprise more and more different electrical devices and their control apparatuses. The present solutions have shown to contain some disadvantages regarding positioning of the electrical devices.

BRIEF DESCRIPTION OF THE INVENTION

An object of the invention is to provide a novel and improved service platform, container handling carrier and method of positioning electrical drive components of a carrier.

The service platform according to the invention is characterized by the characterizing features of a first independent apparatus claim.

The container handling carrier according to the invention is characterized by the characterizing features of a second independent apparatus claim.

The method according to the invention is characterized by the charactering features and steps of an independent method claim.

An idea of the disclosed solution is that a service platform or an access bridge of a container handling carrier is provided with at least one mounting space inside which one or more electric devices or components may be arranged.

An advantage of the disclosed solution is that the service platform may be utilized not only for access purposes but also for providing the carrier with additional space for the electric components and devices. The electric apparatuses inside the mounting spaces are well protected and are still easily reachable. Further, when some of the needed electric devices of the carrier are placed inside the mounting spaces of the service platform then space is set free inside actual electric cabinets for other electric devices. The disclosed solution may be easily implemented in different type carriers. Further, the disclosed platform may also be retrofitted to the existing carriers.

According to an embodiment, the container handling carrier is a straddle carrier configured to move transport containers horizontally between two or more operational positions at a work area and to stack the containers one on the other. By means of the straddle carrier it is possible to lift 3 or even 4 containers one on the other for forming container stacks.

According to an embodiment, the container handling carrier is a shuttle carrier configured to move transport containers horizontally between two or more operational positions at a work area.

According to an embodiment, the service platform is mountable between opposing two upper parts of the vertical frame of the carrier and adjacent to at least one electric cabinet for allowing access to the at least one electric cabinet.

According to an embodiment, the platform is a bridge-like elongated element. The bridge-like platform may be fastened between two horizontal frame beams of a top frame of the carrier. Typically the platform is mounted between upper frame beams which are transverse to the driving direction. In other words, the platform is arranged to be in the driving direction.

According to an embodiment, construction of the platform is made by sheet metal technologies comprising edging, bending, roll forming and punching. Further, the platform may comprise several pre-formed metallic components connected to each other by welded joints. The components may be formed by the sheet metal technologies or by extrusion, for example. The basic construction of the platform is relatively light-weight compared to components of the actual frame beams and components of the carrier.

According to an embodiment, the service platform comprises several mounting spaces for receiving several electrical components. The mounting spaces may be arranged successively in a longitudinal direction of the service platform. Number of the mounting spaces may be 2-10, for example.

According to an embodiment, the bottom surface of the platform is provided with several through openings for improving cooling of the mounting spaces. The openings serve as air passages and they improve air circulation. In some cases it may be possible to provide the mounting space with a cooling fan for additionally improving cooling. The electrical devices or components arranged inside the mounting spaces may comprise integrated cooling fans and the openings of the bottom surface are beneficial then too.

According to an embodiment, the platform is provided with a cooling system comprising at least one cooling agent circulation flow channel connectable to the electric components mounted inside the mentioned mounting spaces.

According to an embodiment, the cooling agent circulation flow channel of the platform is connected to a cooling unit located external to the platform. The cooling unit may arranged to a suitable place depending on lay-out of a top part of the carrier.

According to an embodiment, the platform is provided with an independent cooling system and comprises all the needed devices and components for circulating and cooling the cooling agent at the mounting spaces. An advantage of this embodiment is that the platform may be a pre-assembled configuration which is ready for use as such.

According to an embodiment, the electrical components mounted inside the mounting spaces are connected to the cooling system of the platform.

According to an embodiment, the cooling system is a liquid cooling system whereby the cooling agent may be water or oil, for example. An advantage of the liquid cooling system is that it provides effective cooling.

According to an embodiment, the platform is provided with at least one liquid cooling unit comprising: at least one pumping device for circulating the cooling agent; at least one heat exchanger; cooling agent channels; at least one control element for controlling the cooling; and a frame or support elements.

According to an embodiment, the platform is provided with at least one liquid cooling unit or is connected to a liquid circulation system. Further, at least one mounting space of the platform is provided with a cooling liquid reservoir, which is in fluid connection to the cooling system.

According to an embodiment, the mentioned liquid cooling unit is mounted on the top surface side at one end portion of the platform.

According to an embodiment, the upper surface of the platform comprises a grating or grid and below the grating is a solid cover layer for protecting the mounting spaces from falling impurities and moisture.

According to an embodiment, the upper surface of the platform comprises openable lids at the mounting spaces. The lids may be lifted of or they may be hinged.

According to an embodiment, an inner side surface of the bottom surface of the platform comprises several cable support elements and several tube or hose support elements.

According to an embodiment, vertical height of the platform is less than 500 mm. The platform is made as thin as possible so that it does not form visibility objects for the operator. Typically the vertical height is between 200-500 mm.

According to an embodiment, one single longitudinal side of the platform opposing the electrical cabinet is provided with safety rails on the top surface side of the platform.

According to an embodiment, the platform comprises at least five mounting spaces. The number of the mounting spaces may be 5-10, for example.

According to an embodiment, the platform comprises several electrical drive control elements installed inside the mounting spaces. The mentioned electrical drive control elements may be frequency converters or inverters for controlling electrical motors.

According to an embodiment, the straddle carrier comprises one or more electric cabinets mounted in connection with an upper frame. The electric cabinet comprises an openable door. The platform is located adjacent the electric cabinet and is on the side of the mentioned door thereby allowing easy access to the electric cabinet. This way, service and installation work of the electric devices inside the electric cabinets is safe and easy.

According to an embodiment, the carrier comprises several electrical drive motors by means of which the carrier is moved. The drive motors are controlled by means of frequency converters. At least part of the frequency converters are mounted inside the mounting spaces of the service platform. Further, the carrier may comprise electric motors also in connection which a lifting device, for example. The lift motors as well as hydraulic pumps and other electric motors may also be controlled by means of the frequency converters or inverters which may also be located inside the mounting spaces of the platform.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
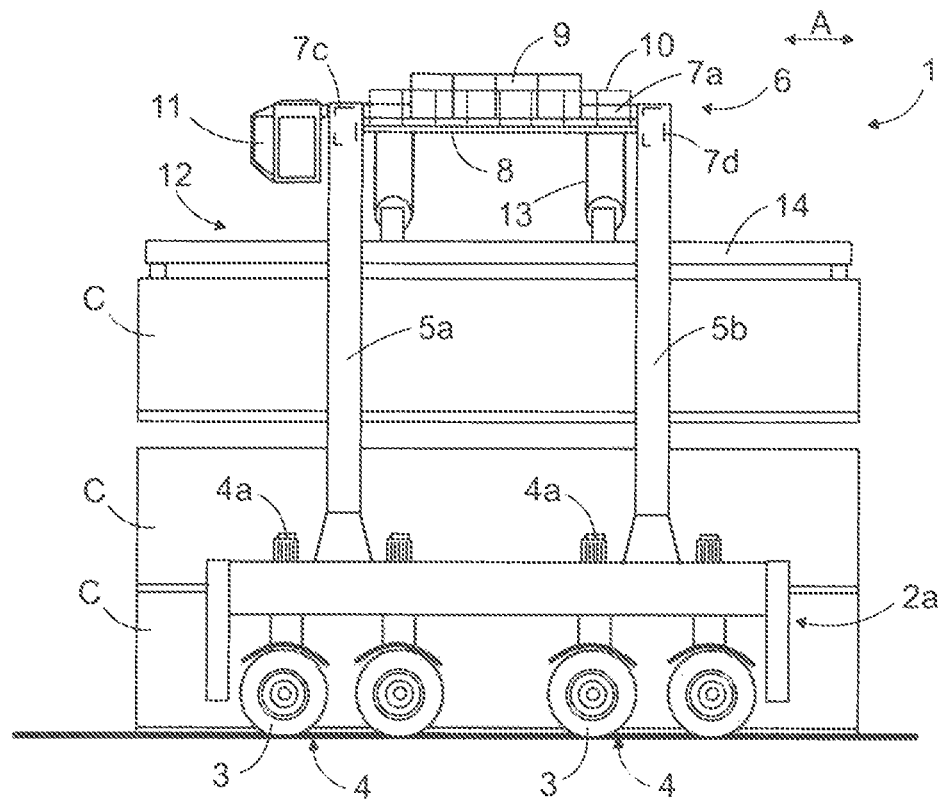
FIG. 1 is a schematic side view of a straddle carrier.
Figure 2:
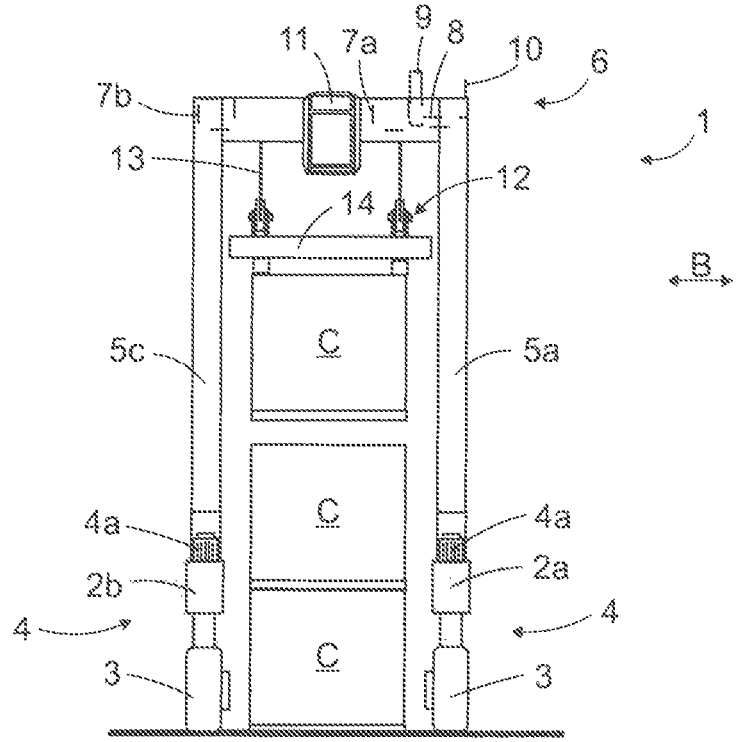
FIG. 2 is a schematic front view of the straddle carrier of FIG. 1.

FIGS. 1 and 2 show a straddle carrier 1 as an example of a container handling carrier. The disclosed solution may also be applied in shuttle carriers. Main difference between the straddle carrier and the shuttle carrier is that the shuttle carrier is designed only to transport containers whereas the straddle carrier is designed to transport and stack the containers. Basic structures of the straddle carriers and the shuttle carriers are the same.

The carrier 1 comprises two lower frame parts 2a, 2b spaced at a track distance from each other. The frame parts 2a, 2b are provided with wheels 3 and drive units 4 for moving and steering the carrier 1. The drive units 4 may comprise electrical motors 4a. Number of the wheels 3 may be 2-4 per each frame part 2a, 2b, depending on capacity of the carrier 1, and the wheels 3 may be steerable. The carrier 1 further comprises four gantry supports 5a-5d which are supported on the lower frame parts 2a, 2b. The gantry supports 5a-5d are spaced apart from one another and extend parallel to one another in the vertical direction. At upper ends of the gantry supports 5a-5d is an upper frame 6 which connects the four gantry supports to one another. The upper frame 6 may comprise four horizontal frame beams 7a-7d. The frame beams 7a-7d may be on a same horizontal plane. Between two opposing gantry supports 5a-5d or between opposing frame beams 7a-7d of the upper frame 6 is one or more service platforms 8 which may serve as bridge-like elements. The service platform 8 may be arranged in a driving direction A of the carrier 1. However, the platform 8 may also be arranged between frame beams which are in the driving direction A, whereby direction of the platform 8 is transverse relative to the driving direction A. The platform 8 may be arranged alongside electrical cabinets 9, which are located at the top part of the frame. The platform 8 and the electrical cabinets 9 comprise spaces for electrical devices and components of the carrier 1. The platform 8 may also comprise safety rails 10.

At the top part of the carrier 1 may also be a control cabin 11 provided with manual steering and control means for an operator, or alternatively, the carrier 1 may be remote controlled or fully autonomously controlled, whereby no control cabin 11 is necessarily needed. FIG. 2 shows that the control cabin 11 may be located at a middle of the upper frame 6, but typically it is located asymmetrically at right. The carrier 1 further comprises a lifting device 12 for lifting containers C. The lifting device 12 is supported to the upper frame 6 by means of wire ropes 13, chains or corresponding bendable transmission elements. As can be seen, the carrier 1 may be positioned above the containers C so that the lower frame parts 2*a*, 2*b* and the gantry supports 5*a*, 5*b* and 5*c*, 5*d* are on opposite sides of the containers C. The lifting device 12 may comprise a spreader 14 provided with locking elements configured to be inserted inside locking holes which are located at top corners of the containers C.

Figure 3:
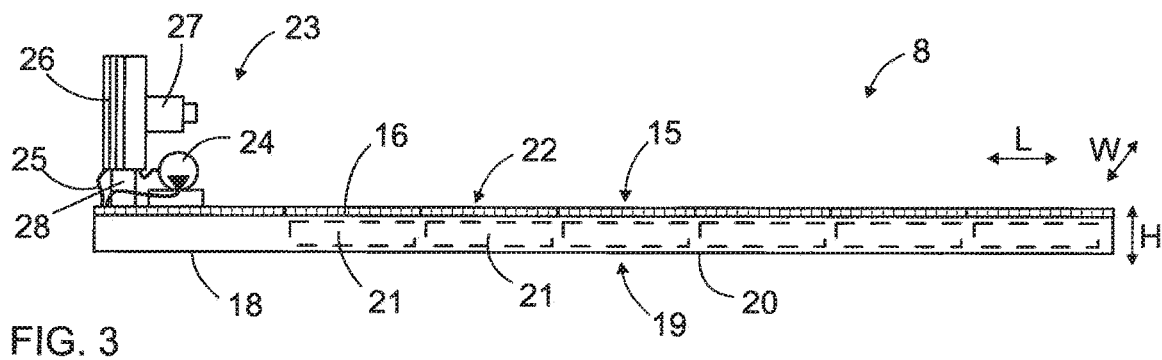
FIG. 3 is a schematic side view of a service platform provided with a cooling unit.

FIG. 3 discloses a service platform 8, which is an elongated bridge-like element having length L, width W and height H. On an upper surface side 15 of the platform 8 may be a grating 16 for ensuring a safe slip free surface on which maintenance personnel may move. The platform 8 comprises a frame 18 on which the grating 16 is supported. On a lower surface side 19 of the platform 8 is a bottom 20 of the frame 18. The bottom 20 of the frame 18 may comprise openings. Between the grating 16 and the bottom surface 20 in one or more mounting spaces 21. In FIG. 1 number of the mounting spaces 21 is six but the number of the mounting spaces may be 1-10, for example. Between the adjacent mounting spaces 21 may be transverse partition walls. The grating 16 may be divided into several parts, which may serve as openable lids 22 for the mounting spaces 21.

FIG. 3 further discloses that the platform 8 may be provided with a liquid cooling unit 23 by means of which the mounting spaces 21 and devices arranged inside them can be cooled. The liquid cooling unit 23 may comprise a pumping device 24 for circulating cooling agent, such as water or oil, in cooling agent channels 25, such as tubes and hoses. The unit 23 also comprises a heat exchanger 26 for cooling the cooling agent. In connection with the heat exchanger 26 may be a fan which is rotated by means of an electric motor 27. The unit may further comprise a frame 28 for fastening the unit on the platform 8 or to any other suitable place at the top frame of the carrier. Further, the unit 23 comprise control means for controlling operation of the included devices and for controlling fluid circulation of the system. The unit may also be provided with one or more cooling agent reservoirs or tanks.

Figure 4:
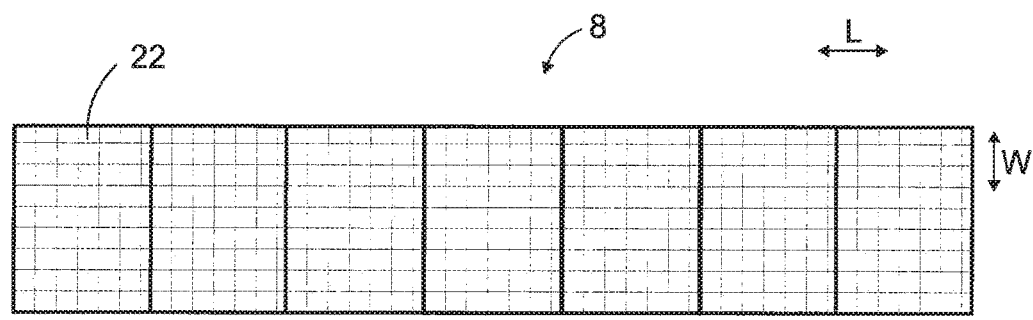
FIG. 4 is a schematic top view of a service platform, which is without a cooling system.

FIG. 4 discloses an alternative platform 8 which is not provided with a liquid cooling unit. The platform 8 comprises several adjacent mounting spaces which are covered by removable lids 22.

Figure 5:
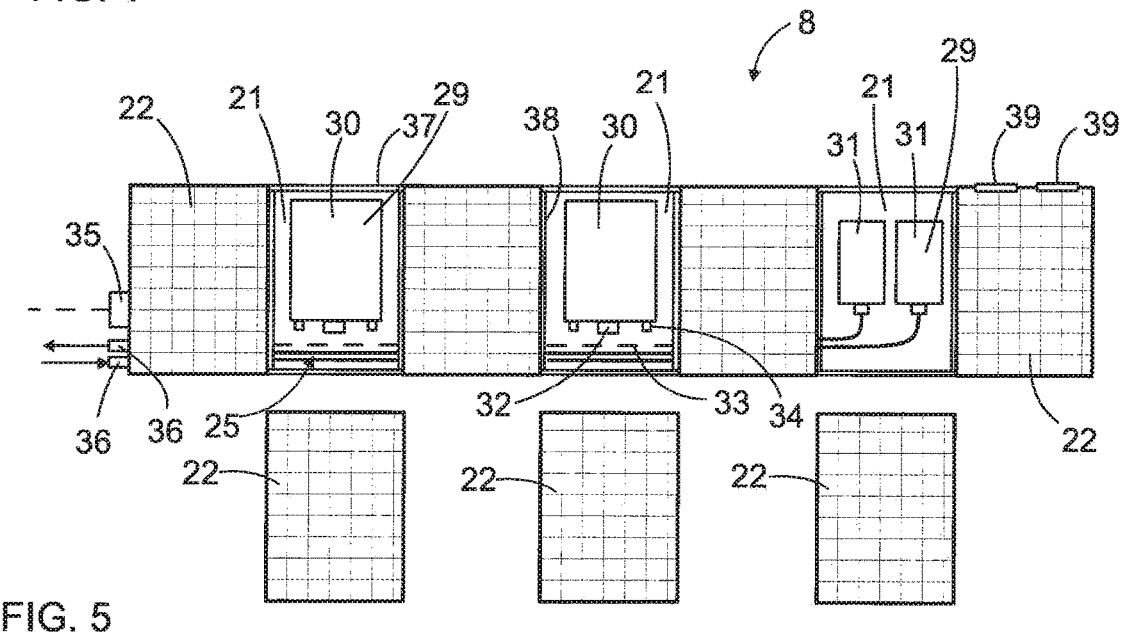
FIG. 5 is a schematic top view of a service platform provided with a cooling agent circulation system.

FIG. 5 discloses a platform 8 comprising several adjacent mounting spaces 21 inside which are arranged electrical components 29 such as frequency converters 30 and other electrical control devices 31 for controlling electric actuators such as electric motors. The electrical component 29 may comprise a switch box 32 for connecting the component 29 to an electric line 33 comprising one or more electric control cables and power feed cables. The electrical components 29 may also comprise cooling agent ports 34 for feed and discharge of cooling agent. Inside the electrical component 29 may be an internal cooling circuit which may be connected to an external cooling system. The platform 8 may comprise an electric connection element 35 and cooling agent connection elements 36 for connecting the platform to an electric system of the carrier and to the cooling system, which is located external to the platform 8.

FIG. 5 also discloses that the lids 22 may be removable elements and they may be supported vertically on side walls 37 of a frame of the platform 8. Between the mounting space 21 may be partition walls 38 upper surfaces of which may also provide support for the lids 22. Alternatively, the lids are not entirely removable but are connected by means of hinges 39 to the frame of the platform 8.

Figure 6:
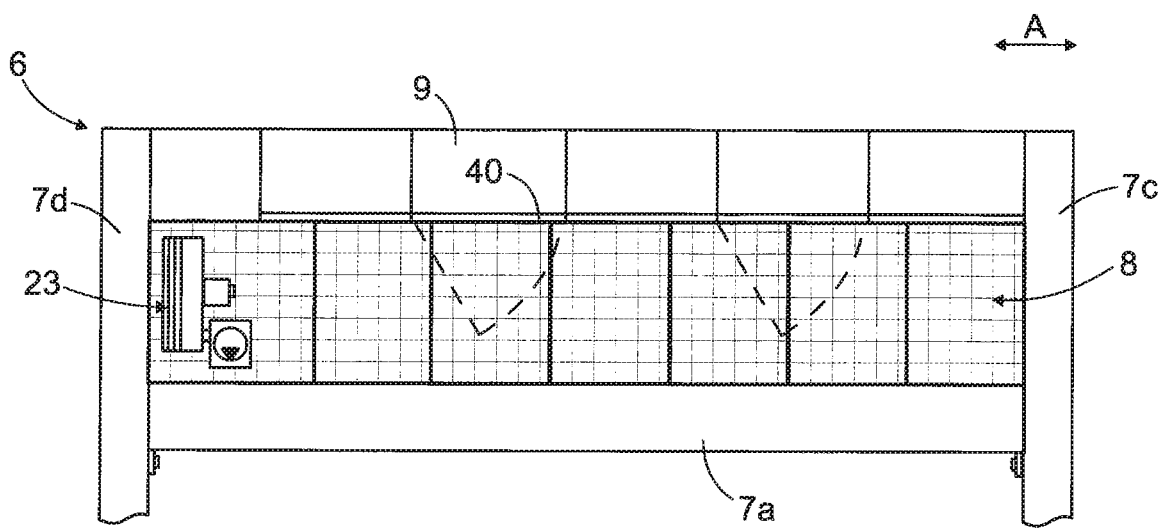
FIG. 6 is a schematic top view showing part of a top frame of a carrier and illustrating relative positions of electronic cabinets and a service platform.

FIG. 6 discloses that the platform 8 may be located between electrical cabinets 9 and a frame beam 7*a* of an upper frame 6. As can be noted, the frame beam 7*a* may be located at a transverse distance from an outer surface side of the carrier. The electrical cabinets 9 may comprise doors 40 on the side of the platform 8. In this embodiment no safety rails are needed since the platform is between the cabinets 9 and the frame beam 7*a*. At one end portion of the platform is a liquid cooling unit 23. When the unit 23 is located on the platform 8 service of the unit 23 is facilitated.

Figure 7:
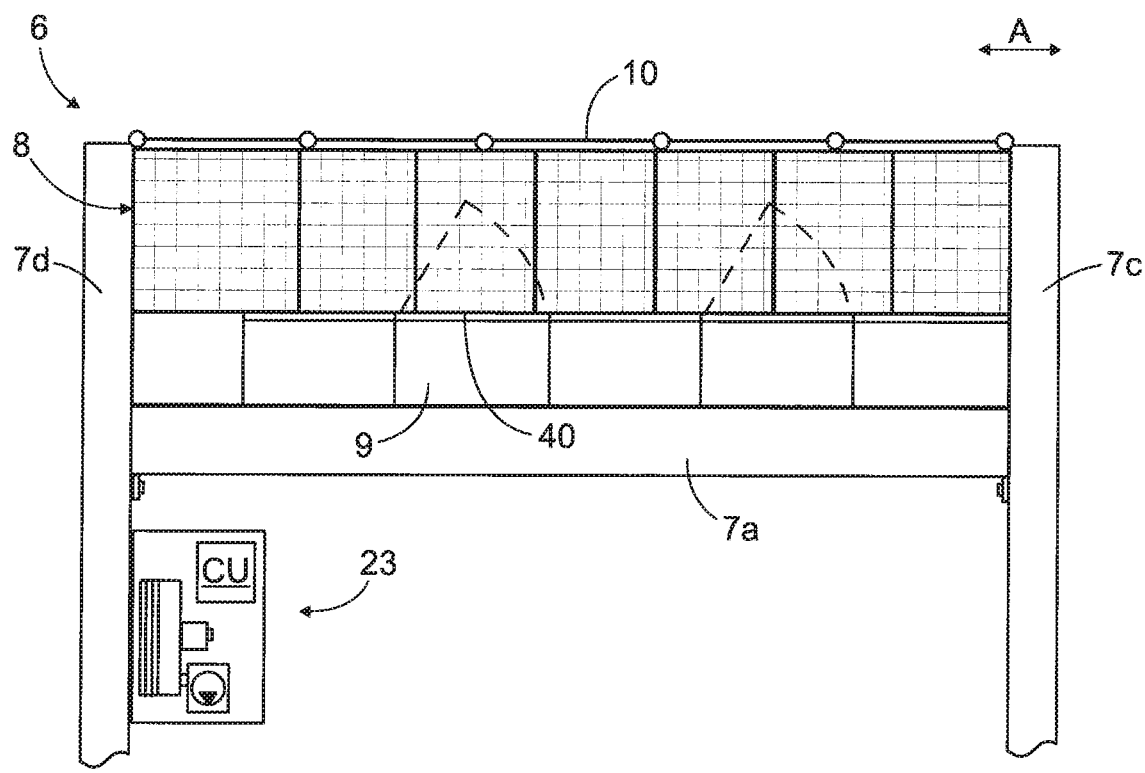
FIG. 7 is a schematic top view showing an alternative solution for positioning the service platform and the electronic cabinets at the top part of the carrier.

In FIG. 7 upper layout of the upper frame 6 is different compared to previous FIG. 6. Now the electric cabinets 9 are located between the frame beam 7*a* and the platform 8. In other words, the platform is located on an open side of the upper frame 6. A further difference to the previous figure is that the liquid cooling unit 23 is not arranged in connection to the platform but is mounted to a frame beam 7*d* and is located at a distance from the platform 8. Then the platform 8 may comprise connecting means 35, 36 disclosed in FIG. 5. The operation of the unit 23 may be controlled by means of a control unit CU, which may be configured to control the components of the unit as well as possible control valves and other flow controlling means.

Figure 8:
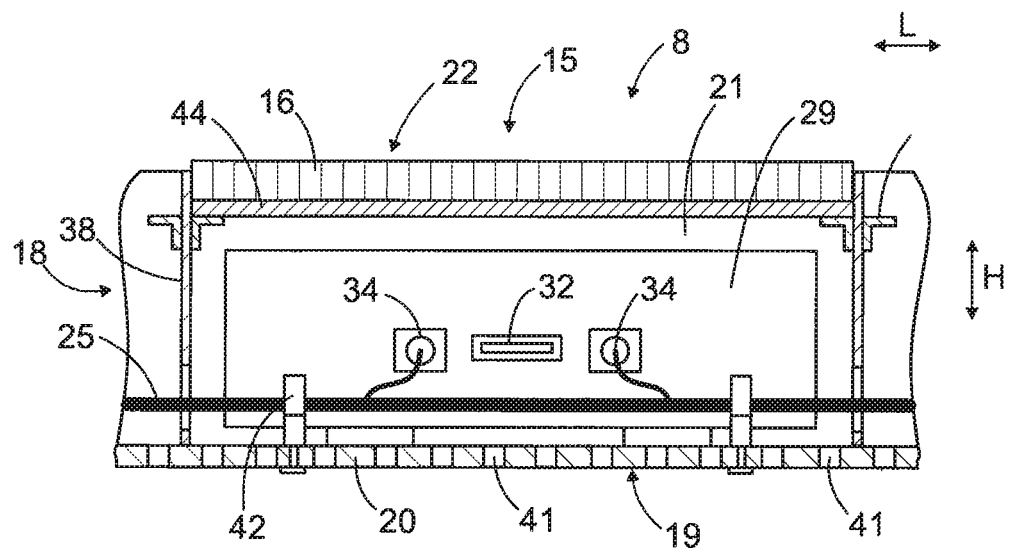
FIG. 8 is a schematic and cross-sectional view of a service platform.

FIG. 8 discloses that the bottom 20 of the frame 18 of the platform 8 may comprise several through openings 41 for improving heat transfer away from the mounting space 21. FIG. 8 further discloses that the cooling agent tube 25 or hose may be connected to the bottom 20 of the platform 8 by means of support elements 42. Same kind of support elements may also be used for holding the electrical cables inside the platform 8. The lids 22 may be supported vertically by means of suitable support elements 42 such as angle pieces. Further, below the grating 16 may be a solid cover layer 44 for protecting the mounting space 21 from falling dirt and water.

The drawings and the related description are only intended to illustrate the idea of the invention. In its details, the invention may vary within the scope of the claims.

The invention claimed is:

1. A service platform of a container handling carrier which is intended for moving containers, the service platform is an elongated element mountable between two vertical frame parts of the container handling carrier and comprising:
   a top surface and a bottom surface, the top surface configured to permit maintenance personnel to move;
   at least one mounting space between the top surface and the bottom surface for receiving at least one electric component; and
   at least one liquid cooling unit, the at least one liquid cooling unit comprising:
      at least one pump device for circulating a cooling agent;
      at least one heat exchanger for cooling the cooling agent;
      at least one cooling agent circulation flow channel connectable to the at least one electric component mounted inside the at least one mounting space;
      at least one control element for controlling the at least one liquid cooling unit; and
      a cooling unit frame for fastening the at least one liquid cooling unit to the service platform or to an upper frame of the container handling carrier.

2. The service platform as claimed in claim 1, wherein: the bottom surface of the service platform is provided with a plurality of through openings for improving cooling of the at least one mounting space.

3. The service platform as claimed in claim 1, wherein:
the top surface of the service platform comprises a grating and below the grating is a solid cover layer for protecting the at least one mounting space from falling impurities and moisture.

4. The service platform as claimed in claim 1, wherein:
the top surface of the service platform comprises openable lids configured to allow access to the at least one mounting space.

5. The service platform as claimed in claim 1, wherein:
a vertical height of the service platform is less than 500 mm.

6. The service platform as claimed in claim 1, wherein:
one single longitudinal side of the service platform opposing an electrical cabinet is provided with at least one safety rail on an outer side of the top surface of the service platform.

7. The service platform as claimed in claim 1, wherein:
the at least one mounting space comprises at least five mounting spaces.

8. The service platform as claimed in claim 1, wherein:
the service platform comprises a plurality of electrical drive control elements of the at least one electric component installed inside the at least one mounting space.

9. A container handling carrier for moving containers, the container handling carrier comprises:
- two lower frame parts spaced at a track distance from each other, the two lower frame parts being provided with a plurality of wheels and a plurality of drive units for moving and steering the container handling carrier;
- four gantry supports which are supported on the two lower frame parts, the four gantry supports are spaced apart from one another and extend parallel to one another in a vertical direction;
- an upper frame which connects the four gantry supports to one another at upper ends of the four gantry supports;
- at least one service platform arranged between two opposing pairs of the four gantry supports or between opposing parts of the upper frame;
- a lifting device for lifting the containers, which the lifting device is supported by the upper frame;

and wherein the at least one service platform comprises:
- a top surface and a bottom surface, the top surface configured to permit maintenance personnel to move;
- at least one mounting space between the top surface and the bottom surface for receiving at least one electric component; and
- at least one liquid cooling unit, the at least one liquid cooling unit comprising:
  - at least one pumping device for circulating a cooling agent;
  - at least one heat exchanger for cooling the cooling agent;
  - at least one cooling agent circulation flow channel connectable to the at least one electric component mounted inside the at least one mounting space;
  - at least one control element for controlling the at least one liquid cooling unit; and
  - a cooling unit frame for fastening the at least one liquid cooling unit to the at least one service platform or to the upper frame of the container handling carrier.

10. The container handling carrier as claimed in claim 9, wherein:
the container handling carrier further comprises at least one electric cabinet mounted in connection with the upper frame;
each of the at least one electric cabinet comprise openable doors; and
the at least one service platform is located adjacent to the at least one electric cabinet and is on a side of the openable doors of the at least one electric cabinet thereby allowing access to the at least one electric cabinet by the maintenance personnel.

11. The container handling carrier as claimed in claim 9 further comprising electrical drive motors of the drive units which are controlled by means of frequency converters of the at least one electric component; and the frequency converters are mounted inside the at least one mounting space of the at least one service platform.

\* \* \* \* \*